4849X
Sheet 1-3 Sheets.
J. Reed.
Cotton Picker.
Patented Aug. 10, 1827.
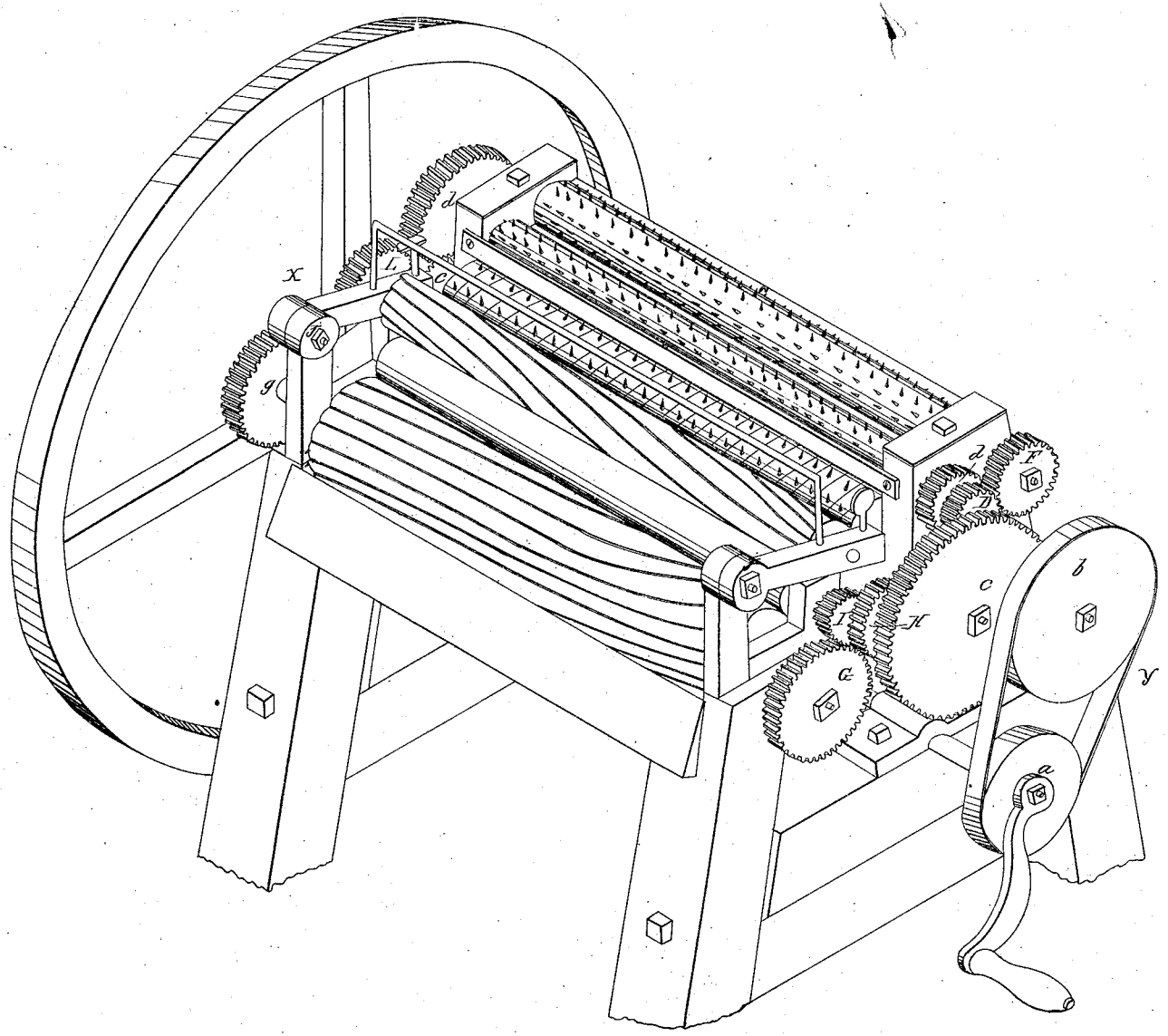
THE GRAPHIC CO. PHOTO-LITH. 39 & 41 PARK PLACE, N.Y.

4849X
3 Sheets—Sheet 2.
J. REED.
Cotton Cleaner.
Patented Aug. 10, 1827.
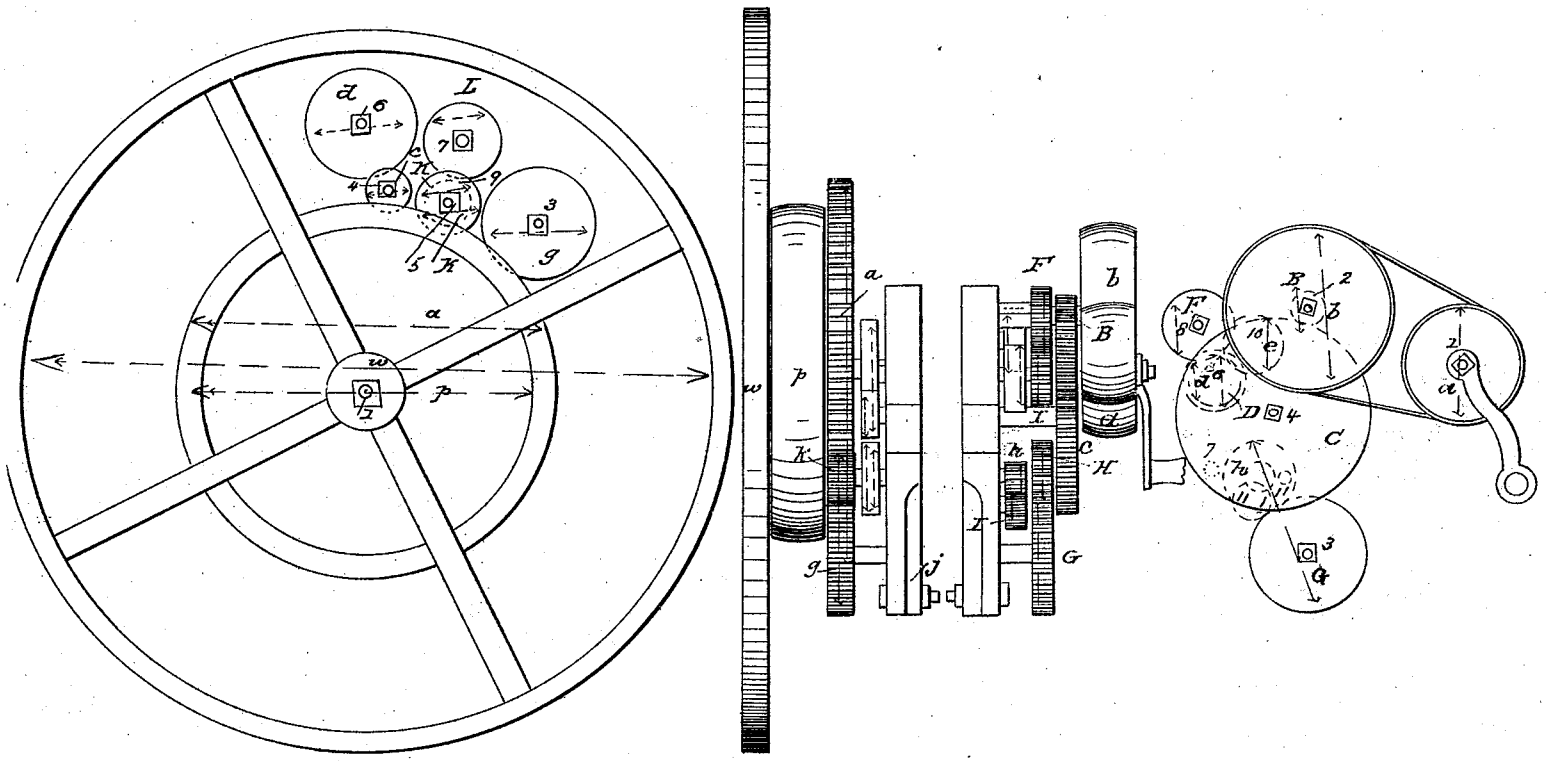
N. PETERS. Photo-Lithographer, Washington, D. C.

4849x
3 Sheets—Sheet 3.
J. REED.
Cotton Cleaner.
Patented Aug. 10, 1827.
Transverse Section
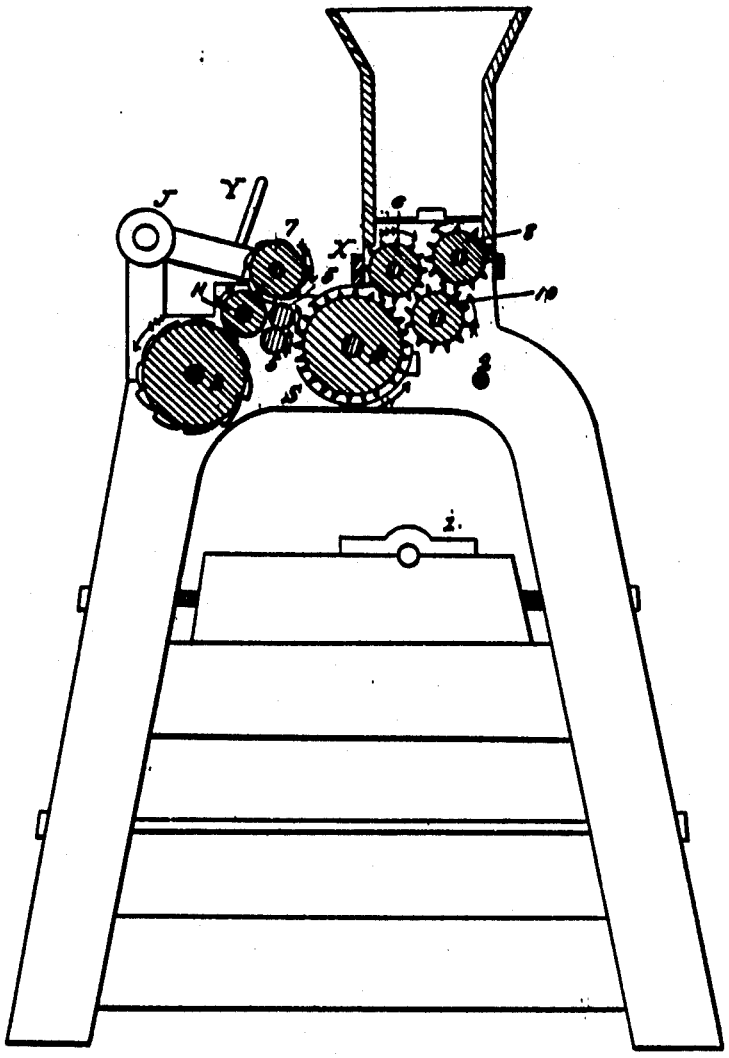
N. PETERS, Photo-Lithographer, Washington, D.C.